US012241435B2

(12) United States Patent
Boswell et al.

(10) Patent No.: US 12,241,435 B2
(45) Date of Patent: Mar. 4, 2025

(54) EXHAUST GAS RECIRCULATION VALVE ASSEMBLY

(71) Applicant: Power Packer North America, Inc., Westfield, WI (US)

(72) Inventors: Mark Jason Boswell, Corning, IA (US); Timothy Garritt House, Urbandale, IA (US)

(73) Assignee: Power Packer North America, Inc., Westfield, WI (US)

( * ) Notice: Subject to any disclaimer, the term of this patent is extended or adjusted under 35 U.S.C. 154(b) by 0 days.

(21) Appl. No.: 18/428,818

(22) Filed: Jan. 31, 2024

(65) Prior Publication Data

US 2024/0280070 A1 Aug. 22, 2024

Related U.S. Application Data

(60) Provisional application No. 63/485,722, filed on Feb. 17, 2023.

(51) Int. Cl.
*F02M 26/72* (2016.01)
*F02M 26/67* (2016.01)
*F02M 26/74* (2016.01)

(52) U.S. Cl.
CPC ............ *F02M 26/67* (2016.02); *F02M 26/72* (2016.02); *F02M 26/74* (2016.02)

(58) Field of Classification Search
CPC ........ F02M 26/70; F02M 26/67; F02M 26/72; F02M 26/74; F16K 1/22; F16K 1/18; F02D 9/00

(Continued)

(56) References Cited

U.S. PATENT DOCUMENTS 3,979,104 A 9/1976 Lacoste et al.
4,022,424 A 5/1977 Davis et al.
(Continued)

FOREIGN PATENT DOCUMENTS

AT 368614 B 10/1982
AT 379877 B 3/1986
(Continued)

OTHER PUBLICATIONS

European Patent Office Search Report and Written Opinion for Application No. 24155372.6 dated May 17, 2024 (11 pages).
(Continued)

*Primary Examiner* — George C Jin
*Assistant Examiner* — Teuta B Holbrook
(74) *Attorney, Agent, or Firm* — Michael Best & Friedrich LLP

(57) ABSTRACT

A valve assembly and a method of assembling a valve assembly. The valve assembly may be an exhaust gas recirculation valve assembly and may include a sealing assembly to inhibit flow of gas from a flow passage into an electronics housing. The sealing assembly includes a first seal along a shaft and disposed between the flow passage and a shaft bearing, a second seal along the shaft and disposed between the shaft bearing and the electronics housing, a plate engaged between a valve housing and the electronics housing, and a sealed bearing supported by the plate and pivotably supporting a pinion. A coolant jacket may be formed in the valve housing around the shaft bore proximate the shaft bearing and the first seal. A butterfly member may be connected to the shaft by a pin rammed into a hole extending through the butterfly member and the driven shaft.

10 Claims, 12 Drawing Sheets

(58) Field of Classification Search
USPC ............. 251/305; 123/568.24, 568.2, 568.18
See application file for complete search history.

(56) References Cited

U.S. PATENT DOCUMENTS

| | | | |
|---|---|---|---|
| 4,194,749 | A | 3/1980 | Bonafous |
| 2,747,222 | A | 9/1980 | Barthelemy et al. |
| 2,747,224 | A | 9/1980 | Barthelemy et al. |
| 4,225,112 | A | 9/1980 | Libke |
| 4,225,113 | A | 9/1980 | Barthelemy et al. |
| 4,225,114 | A | 9/1980 | Barthelemy et al. |
| 4,406,441 | A | 9/1983 | Lukesch et al. |
| 4,800,915 | A | 1/1989 | Hormel |
| 9,958,071 | B1 | 5/2018 | Kamp et al. |
| 10,215,289 | B2 | 2/2019 | Kamp et al. |
| 10,294,896 | B2 | 5/2019 | Gerards et al. |
| 10,641,408 | B2 | 5/2020 | Sigg et al. |
| 2010/0031938 | A1 | 2/2010 | Lim et al. |
| 2010/0146954 | A1 | 6/2010 | Sloss et al. |
| 2013/0167815 | A1 | 7/2013 | Bareis |
| 2015/0226161 | A1 | 8/2015 | Bareis et al. |

FOREIGN PATENT DOCUMENTS

| | | | |
|---|---|---|---|
| BE | 520992 | A | 12/1953 |
| BE | 824457 | A | 7/1975 |
| BE | 869234 | A | 1/1979 |
| CH | 309272 | A | 8/1955 |
| CH | 613264 | A | 4/1966 |
| CH | 626144 | A | 10/1981 |
| DE | 1214868 | B | 4/1966 |
| DE | 2642922 | A1 | 3/1977 |
| DE | 8102480 | U1 | 2/1982 |
| DE | 2832607 | C2 | 8/1984 |
| DE | 102014104578 | B4 | 2/2020 |
| EP | 0010357 | B1 | 1/1984 |
| EP | 0056222 | B1 | 12/1984 |
| EP | 3129635 | B1 | 10/2018 |
| EP | 3364080 | B1 | 4/2020 |
| ES | 433874 | A1 | 11/1976 |
| ES | 472046 | A1 | 2/1979 |
| FR | 1074683 | A | 10/1954 |
| FR | 2398940 | B1 | 7/1981 |
| FR | 2258575 | B1 | 10/1981 |
| FR | 2325867 | B1 | 9/1982 |
| FR | 2520833 | A1 | 8/1983 |
| GB | 723730 | A | 2/1955 |
| GB | 744976 | A | 2/1956 |
| GB | 1461231 | A | 1/1977 |
| GB | 2001738 | B2 | 2/1979 |
| KR | 102167802 | B1 | 10/2020 |
| NL | 174755 | C | 8/1984 |
| WO | 2015149995 | A1 | 10/2015 |

OTHER PUBLICATIONS

European Patent Office Action for Application No. 24155372.6 dated Oct. 8, 2024 (13 pages).

EXHAUST GAS RECIRCULATION VALVE ASSEMBLY

CROSS-REFERENCE TO RELATED APPLICATIONS

This application claims priority to U.S. Provisional Patent Application No. 63/485,722 filed on Feb. 17, 2023, the entire contents of which are incorporated herein by reference.

FIELD

The present disclosure generally relates to valve assemblies and, more particularly, to exhaust gas recirculation (EGR) valve assemblies.

SUMMARY

In general, EGR valve assemblies are used to control the recirculation of exhaust gases through combustion chambers within internal combustion engines. Exhaust gas recirculation that is improperly controlled may result in air/fuel mixtures that are too rich or too lean for efficient combustion.

In one independent aspect, a valve assembly, such as an EGR valve assembly, may generally include a valve housing having a flow housing portion defining a flow passage extending therethrough and along a flow axis, a gear assembly housing portion coupled to the flow housing portion, and a shaft bore extending between the flow passage and the gear assembly housing portion; a driven shaft positioned in the shaft bore and extending along a shaft axis generally transverse to the flow axis; a shaft bearing disposed in the shaft bore and pivotably supporting the driven shaft; a butterfly member coupled to the driven shaft for pivoting movement with the driven shaft about the shaft axis, the butterfly member being pivotable between a closed position, in which flow of gas through the flow passage is inhibited, and an open position; an electronics housing coupled to the valve housing; a printed circuit board supported in the electronics housing; a drive pinion extending between the electronics housing and the gear assembly housing portion, the drive pinion being drivingly coupled to the driven shaft; and a sealing assembly to inhibit flow of gas from the flow passage into the electronics housing.

The sealing assembly may include a first seal positioned in the shaft bore and along the driven shaft to provide a seal between the driven shaft and the shaft bore, the first seal being disposed between the flow passage and the shaft bearing, a second seal positioned in the shaft bore and along the driven shaft to provide a seal between the driven shaft and the shaft bore, the second seal being disposed between the shaft bearing and the electronics housing, a plate engaged between the valve housing and the electronics housing, the plate defining an opening therethrough, the drive pinion extending through the opening into the gear assembly housing portion, and a sealed bearing supported by the plate and pivotably supporting the drive pinion in the opening, the sealed bearing providing a seal between the drive pinion and the plate.

In another independent aspect, a valve assembly, such as an EGR valve assembly, may generally include a valve housing having a flow housing portion defining a flow passage extending therethrough and along a flow axis, the valve housing defining a shaft bore extending from the flow passage; a shaft positioned in the shaft bore and extending along a shaft axis generally transverse to the flow axis; a bearing disposed in the shaft bore and pivotably supporting the shaft; a butterfly member coupled to the shaft for pivoting movement with the shaft about the shaft axis, the butterfly member being pivotable between a closed position, in which flow of gas through the flow passage is inhibited, and an open position; a seal positioned in the shaft bore and along the shaft and disposed in the shaft bore to provide a seal between the shaft and the shaft bore and inhibit gas flow from the flow passage through the shaft bore, the seal being proximate the bearing; and a coolant jacket formed in the valve housing around the shaft bore and configured to receive coolant to cool at least a portion of the valve housing proximate the bearing and the seal.

In yet another independent aspect, a method of assembling a butterfly assembly for a valve assembly, such as an EGR valve assembly, may be provided. The butterfly assembly may include a shaft, a butterfly member defining a shaft bore, and a pin. The method may generally include inserting the shaft into the shaft bore of the butterfly member; after inserting the shaft, drilling a pin hole through the butterfly member and the shaft; and ramming the pin into the pin hole, ramming causing material of the pin, the butterfly member and the shaft to deform and form a unitary structure.

Other independent aspects of the disclosure may become apparent by consideration of the detailed description, claims and accompanying drawings.

DETAILED DESCRIPTION

Figure 1:
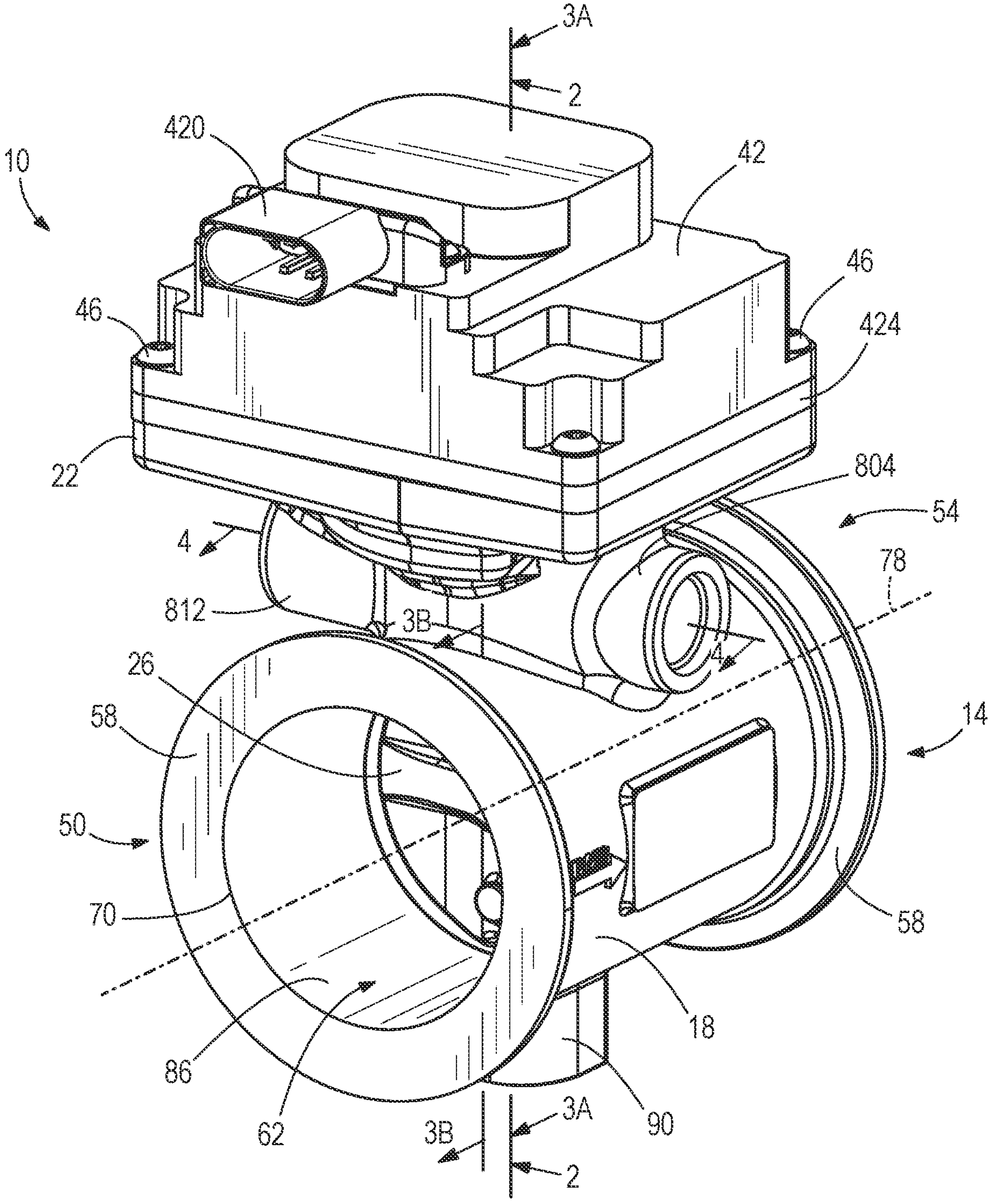
FIG. 1 is a perspective view of a valve assembly, such as an EGR valve assembly.

Before any independent embodiments are explained in detail, it is to be understood that the disclosure is not limited in its application to the details of construction and the arrangement of components set forth in the following description or illustrated in the following drawings. The disclosure is capable of other independent embodiments and of being practiced or of being carried out in various ways. Also, it is to be understood that the phraseology and terminology used herein is for the purpose of description and should not be regarded as limiting.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Relative terminology, such as, for example, "about", "approximately", "substantially", etc., used in connection with a quantity or condition would be understood by those of ordinary skill to be inclusive of the stated value and has the meaning dictated by the context (for example, the term includes at least the degree of error associated with the measurement of, tolerances (e.g., manufacturing, assembly, use, etc.) associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10% or more) of an indicated value.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

Many of the modules and logical structures described are capable of being implemented in software executed by a microprocessor or a similar device or of being implemented in hardware using a variety of components including, for example, application specific integrated circuits ("ASICs"). Terms like "controller" and "module" may include or refer to both hardware and/or software. Capitalized terms conform to common practices and help correlate the description with the coding examples, equations, and/or drawings. However, no specific meaning is implied or should be inferred simply due to the use of capitalization. Thus, the claims should not be limited to the specific examples or terminology or to any specific hardware or software implementation or combination of software or hardware.

The embodiment(s) described below and illustrated in the figures are presented by way of example only and are not intended as a limitation upon the concepts and principles of the present disclosure. As such, it will be appreciated that variations and modifications to the elements and their configuration and/or arrangement exist within the spirit and scope of one or more independent aspects as described.

Figure 2:
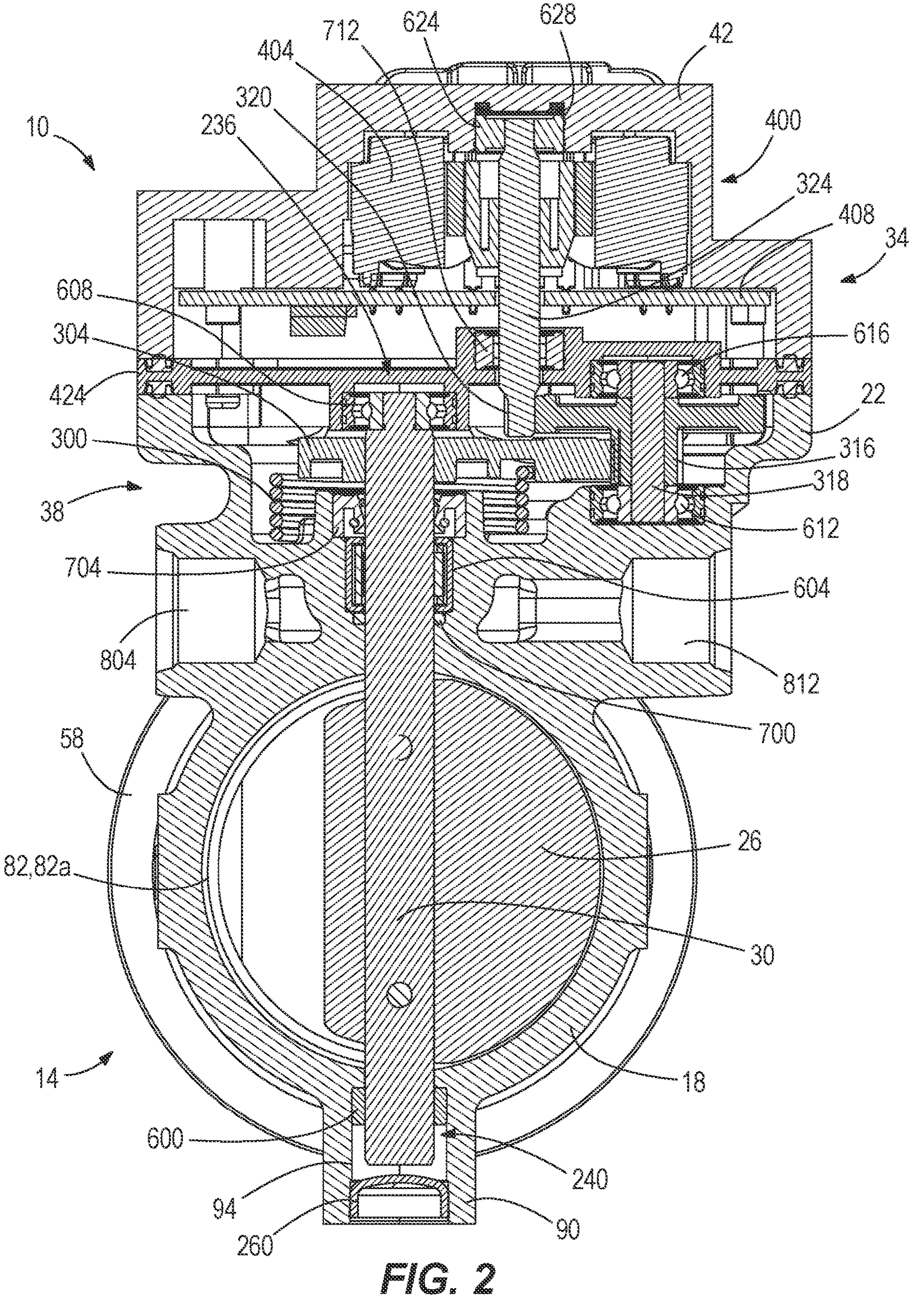
FIG. 2 is a front cross-sectional view of the valve assembly of FIG. 1, taken generally along line 2-2 in FIG. 1.

FIGS. 1-2 illustrate a valve assembly 10, such as an exhaust gas recirculation (EGR) valve assembly and, specifically, a hot-side exhaust gas recirculation valve assembly, operable to control exhaust flow to the engine intake (not shown), thereby controlling the air-to-fuel ratio and reducing engine emissions. In other constructions (not shown), the valve assembly 10 may be another type of valve assembly, for example, an exhaust brake valve assembly.

The valve assembly 10 includes a valve housing 14 having a flow housing portion 18 and a gear assembly housing portion 22, a butterfly flap or butterfly member 26, and a shaft 30 coupled to the butterfly member 26. The butterfly member 26 is supported by the shaft 30 for pivoting movement therewith between an open position, a closed position, in which gas flow is inhibited, and a plurality of intermediate flow positions. The valve assembly 10 further includes a bearing assembly 34, a seal assembly 38, and an electronics housing 42 coupled to the valve housing 14 by fasteners 46 (e.g., screws).

Figure 3A:
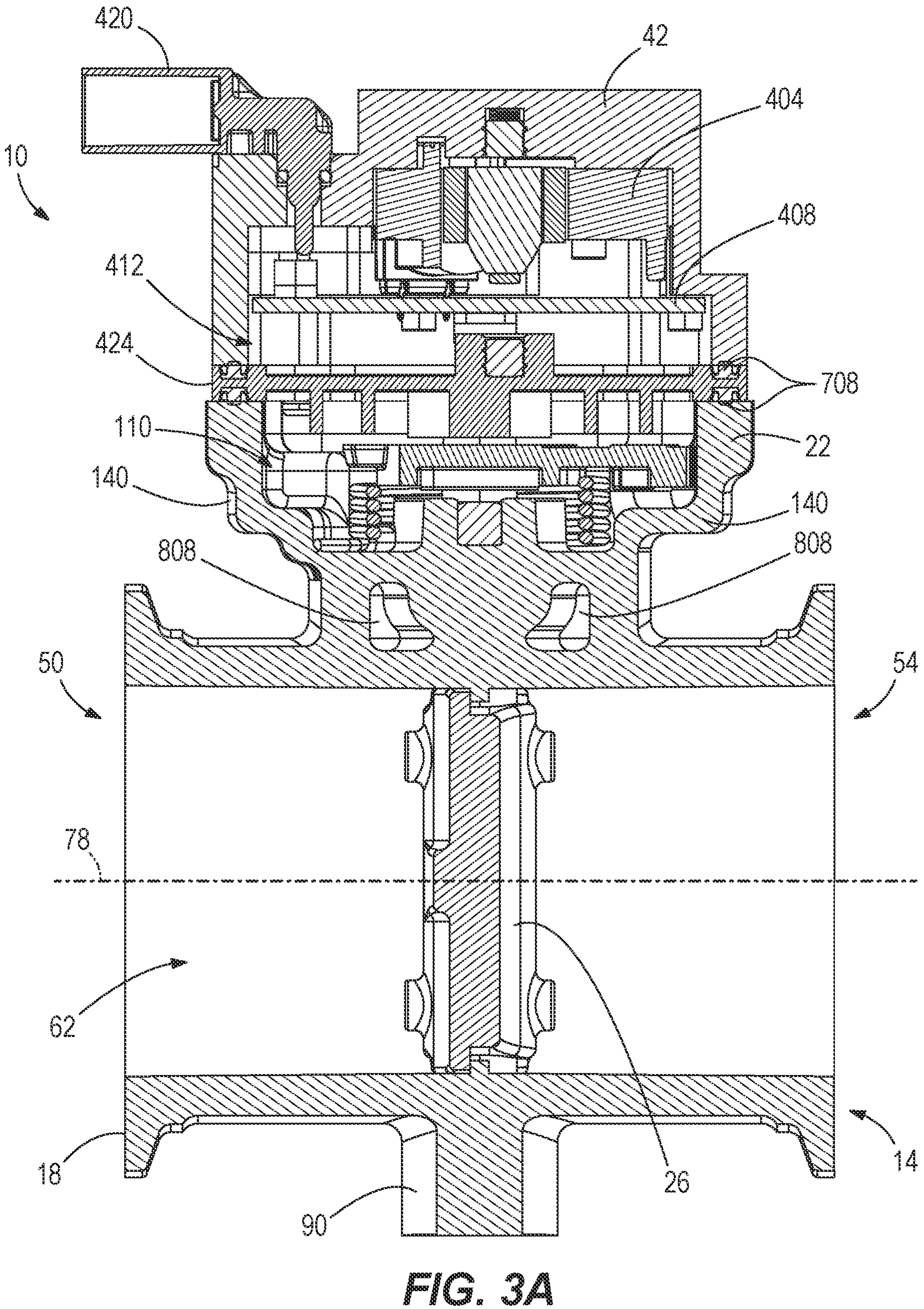
FIG. 3A is a side cross-sectional view of the valve assembly of FIG. 1, taken generally along line 3A-3A in FIG. 1.

The flow housing portion 18 is formed with a generally cylindrical shape between opposite ends 50, 54, each having an exterior flange 58. The flow housing portion 18 defines (see FIG. 3) a flow passage 62 extending therethrough between a first flow opening 70 (e.g., an inlet) at the first end 50 and a second flow opening 74 (e.g., an outlet, see FIG. 5) at the second end 54. The flow passage 62 defines a flow axis 78 extending in a first direction between the openings 70, 74. A sealing flange 82 (see FIG. 5) extends from an interior surface 86 into the flow passage 62, and, in the closed position, the butterfly member 26 engages the sealing flange 82 to inhibit gas flow through the flow passage 62.

Figure 6:
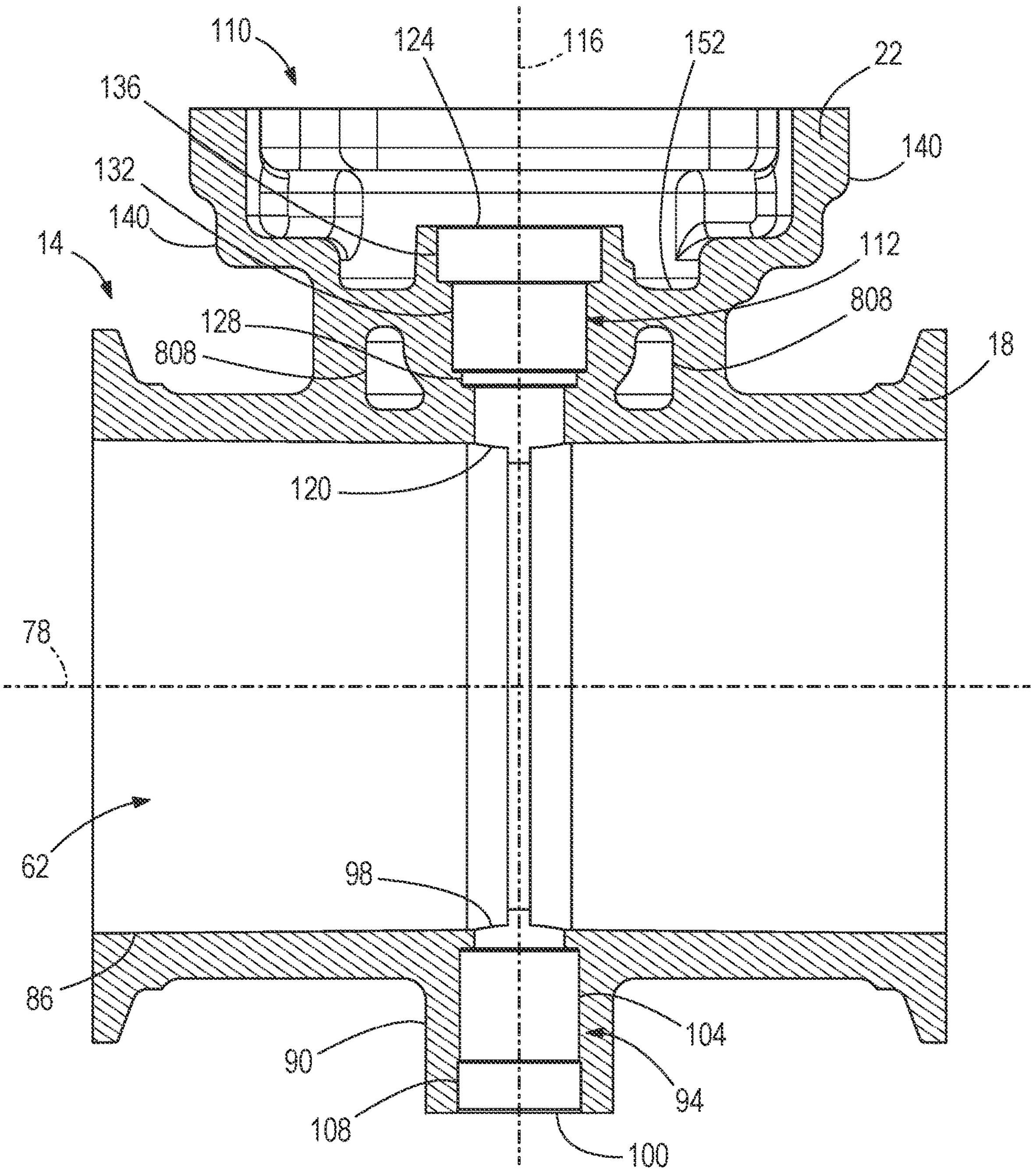
FIG. 6 is a side cross-sectional view of the valve housing of FIG. 5, taken generally along line 6-6 in FIG. 5.
Figure 7:
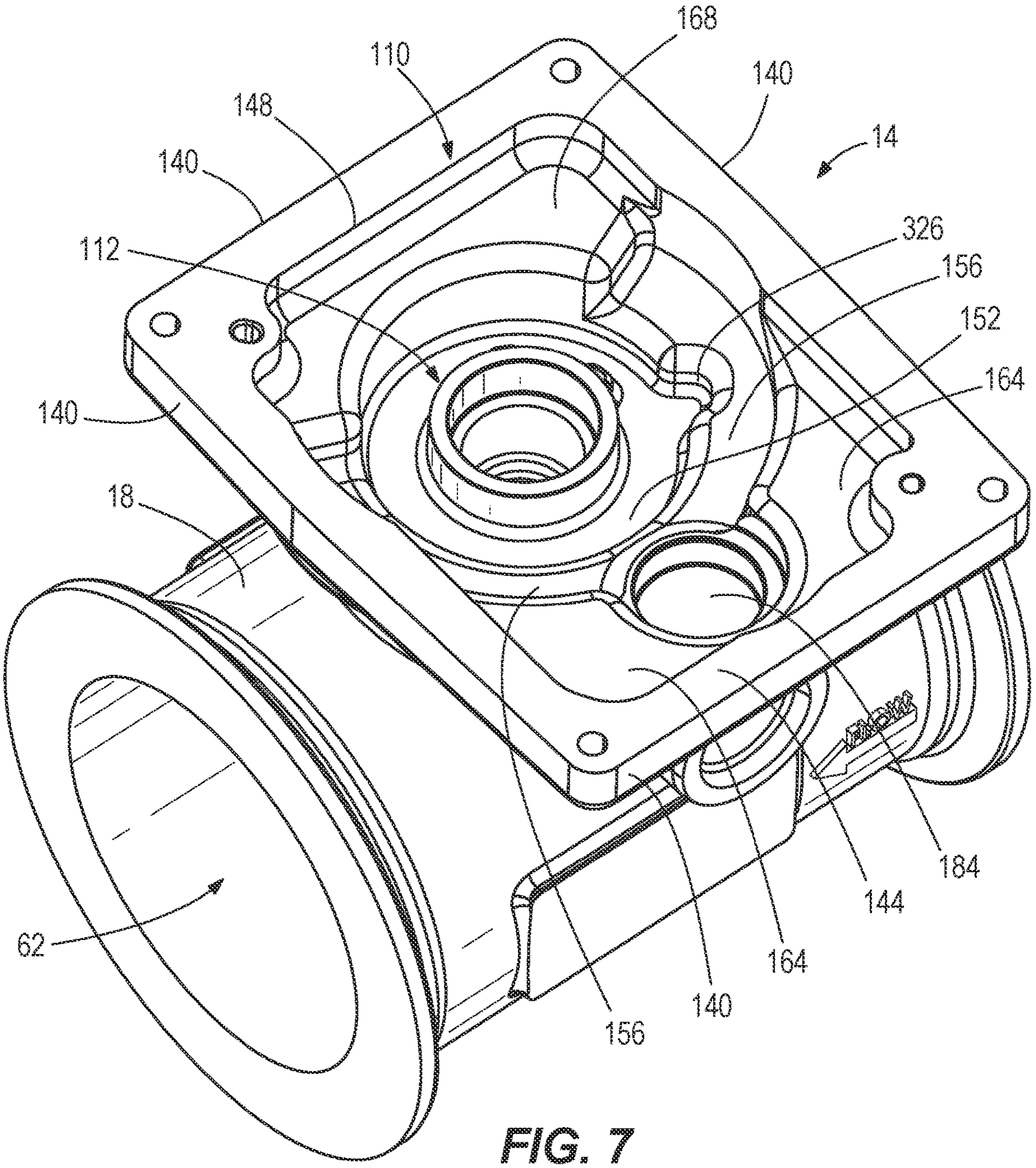
FIG. 7 is a top perspective view of the valve housing shown in FIG. 5.

As shown in FIGS. 1-2, and 6, the valve housing 14 has a protrusion 90 extending from a bottom of the flow housing portion 18. The protrusion 90 defines (see FIG. 6) a bore 94 extending transverse to the flow axis 78 between an opening 98 through the interior surface 86 and an opposite opening 100 formed in an end of the protrusion 90. A bearing seat 104 is formed proximate the opening 98, and a closure member seat 108 is proximate the opening 100.

In the illustrated construction (see FIGS. 2-3A and 6), the gear assembly housing portion 22 is integrally formed with the flow housing portion 18, on a side opposite the protrusion 90. The gear assembly housing portion 22 defines a gear assembly cavity 110 and a bore 112 extending from the flow passage 62 into the gear assembly cavity 110. The bore 112 is coaxial with the bore 94 along a shaft bore axis 116 transverse to the flow axis 78.

The bore 112 has an opening 120 through the interior surface 86 of the flow passage 62 and an opposite opening 124 into the gear assembly cavity 110. A seal seat 128 is formed proximate the opening 120, and a bearing seat 132 is formed adjacent the seal seat 128. Another seal seat 136 is formed proximate the opening 124 into the gear assembly cavity 110.

Figure 5:
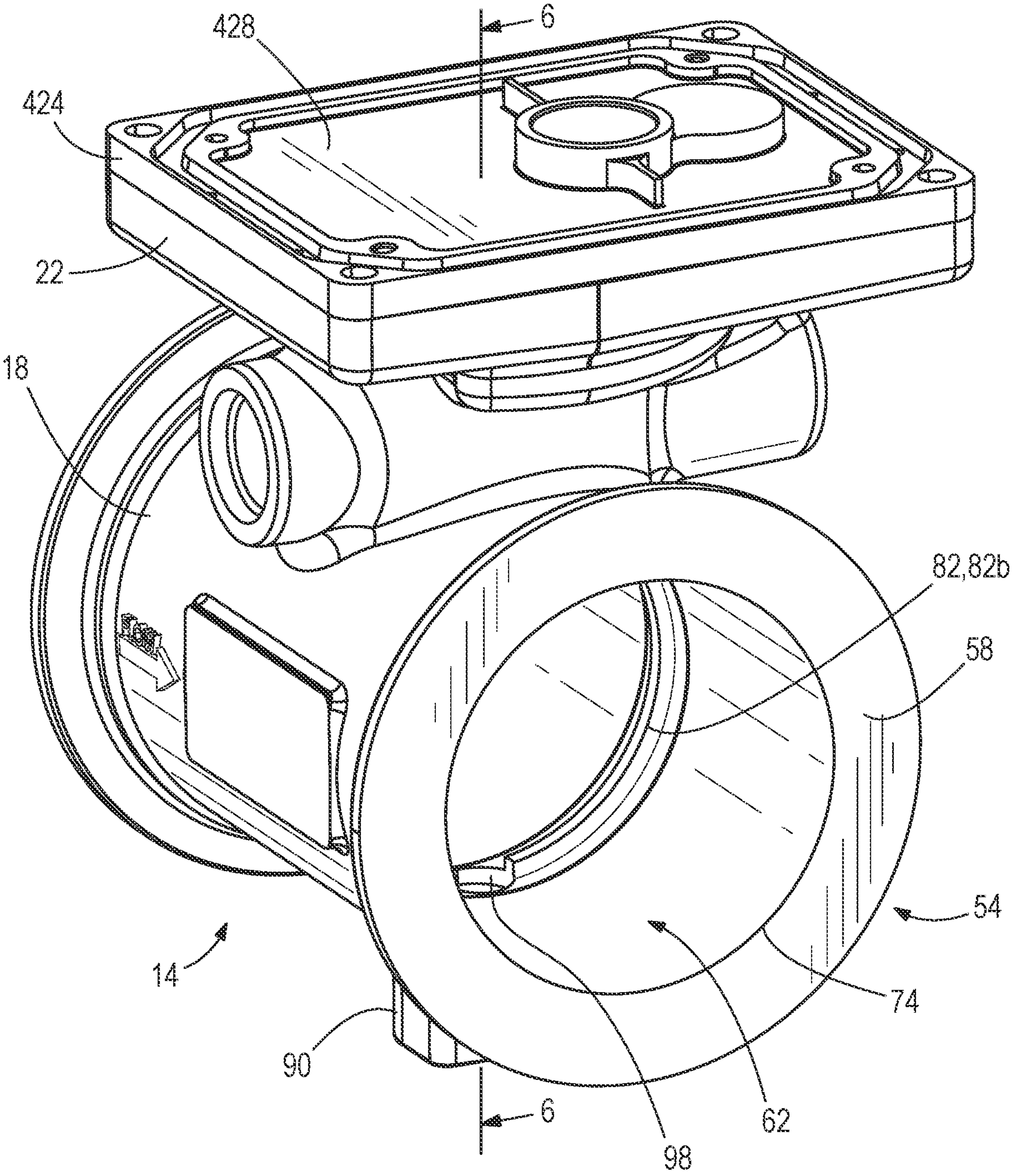
FIG. 5 is a perspective view of a valve housing and a mid-plate of the valve assembly of FIG. 1.

The bore openings 98, 120 are positioned proximate the center of the flow passage 62 and divide the sealing flange 82 into flange halves 82*a*, 82*b* (FIGS. 2 and 5, respectively). As such, the flange halves 82*a*, 82*b* extend along the interior surface 86 of the flow passage 62 between the bore openings 98, 120.

Figure 11:
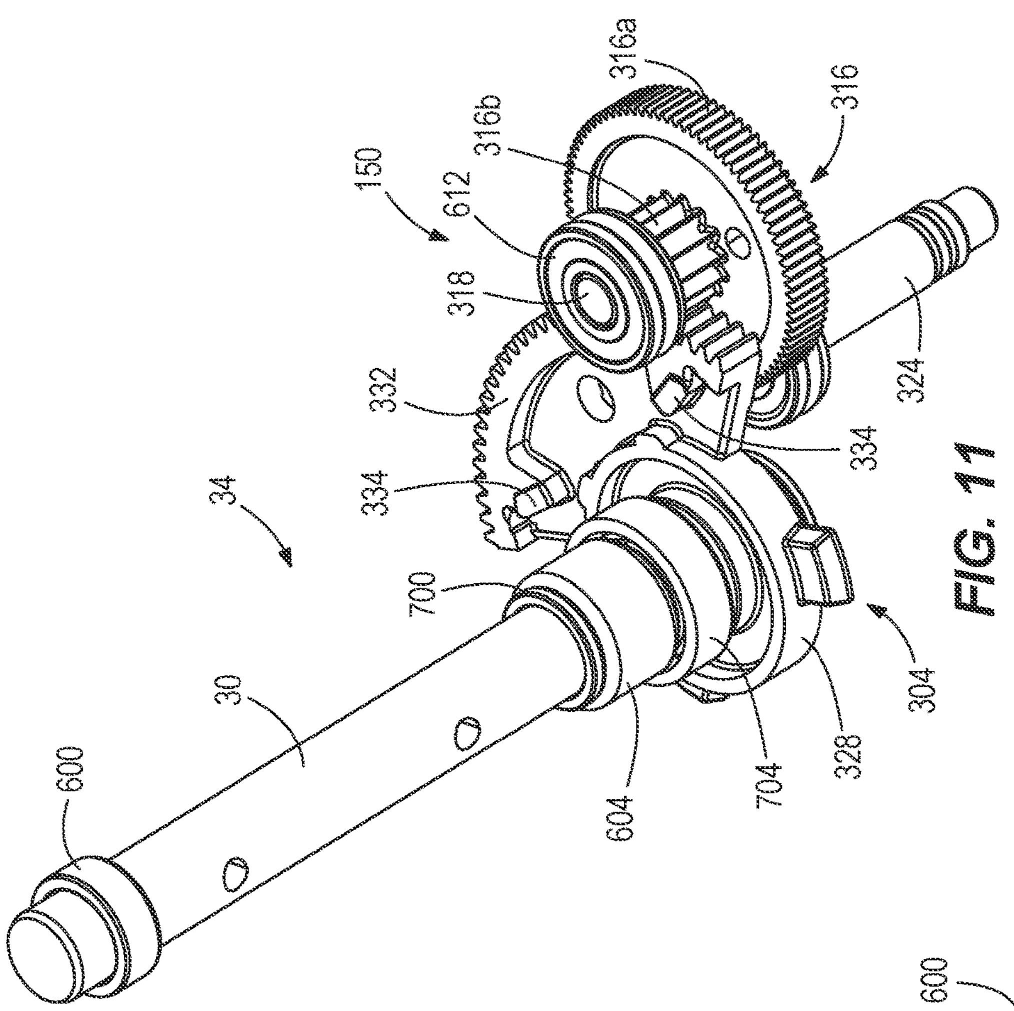
FIG. 11 is a bottom perspective view of the gear assembly shown in FIG. 10.
Figure 10:
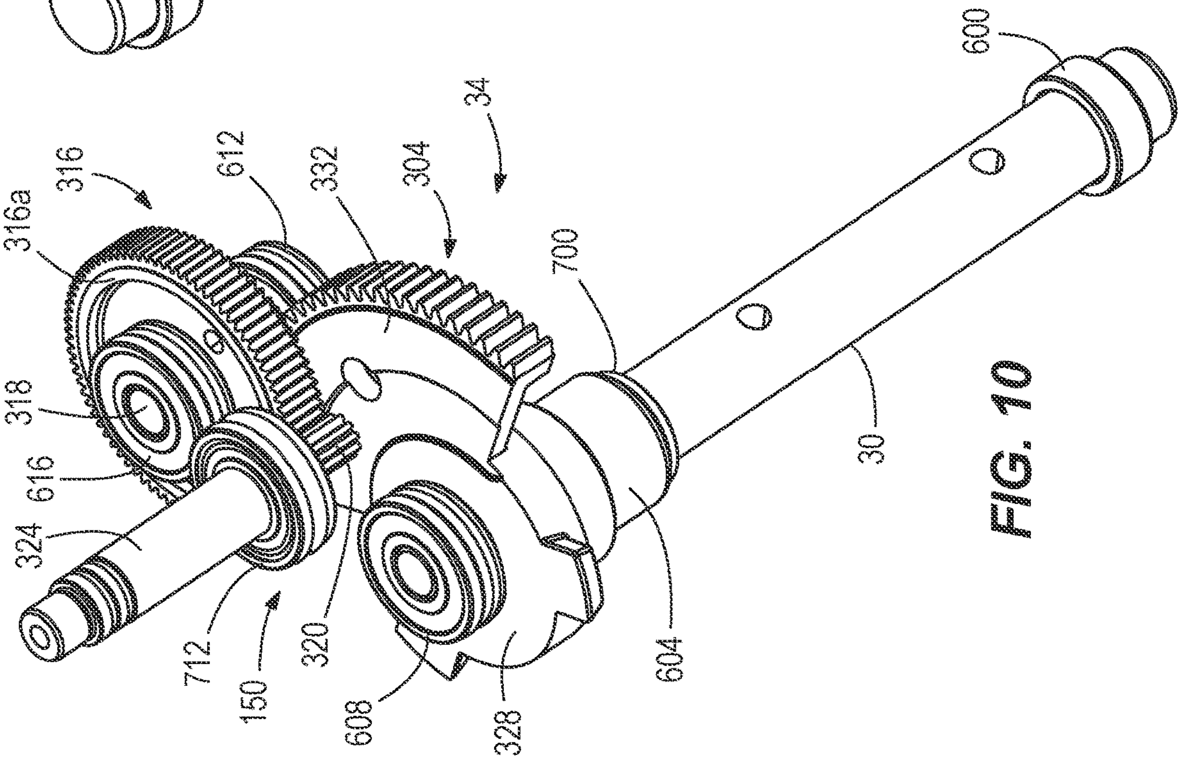
FIG. 10 is a top perspective view of a gear assembly of the valve assembly of FIG. 1.
Figure 13:
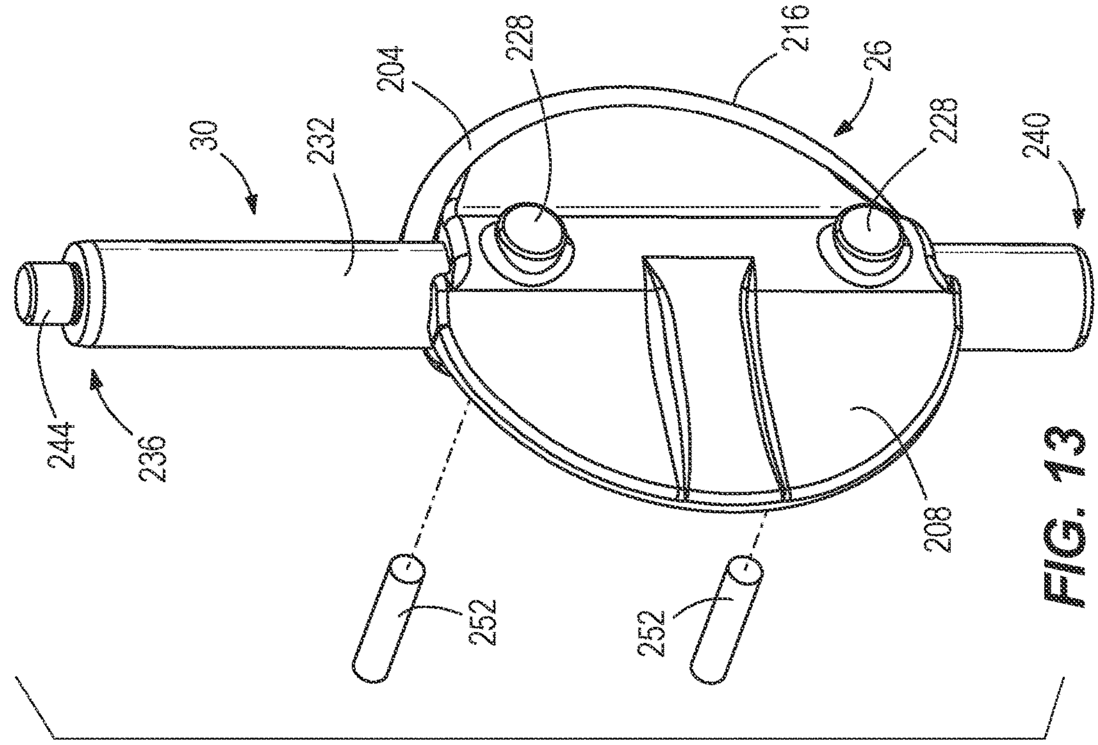
FIG. 13 is a rear perspective view of the butterfly assembly shown in FIG. 12.
Figure 12:
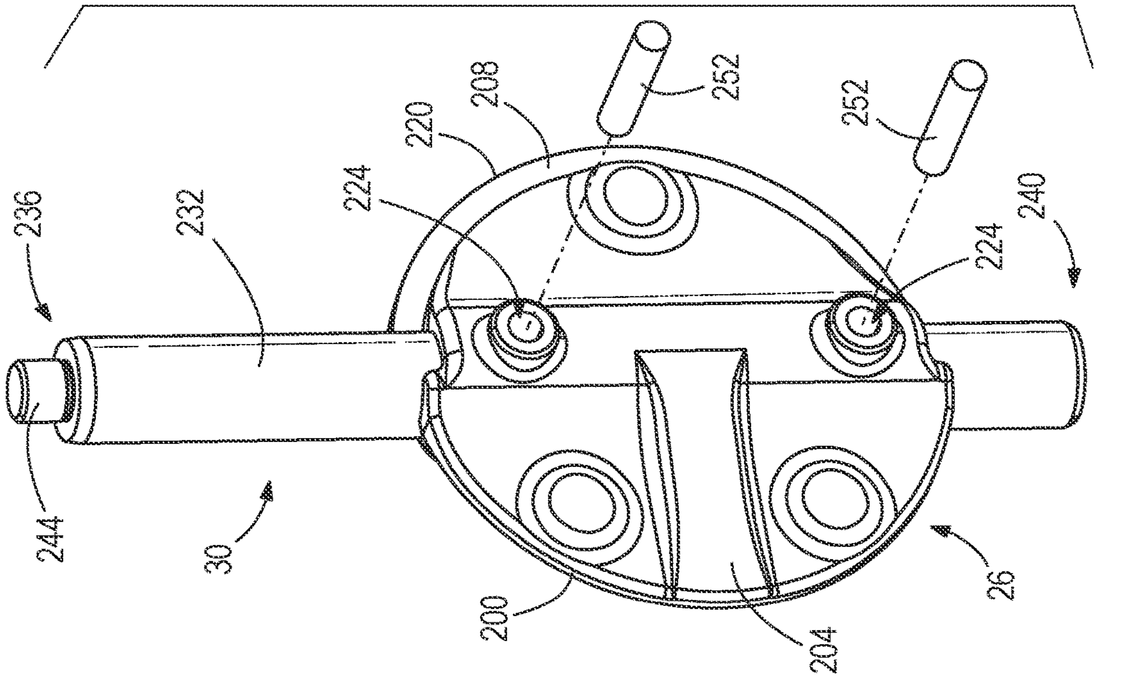
FIG. 12 is a front perspective view of a butterfly assembly of the valve assembly of FIG. 1.
Figure 15:
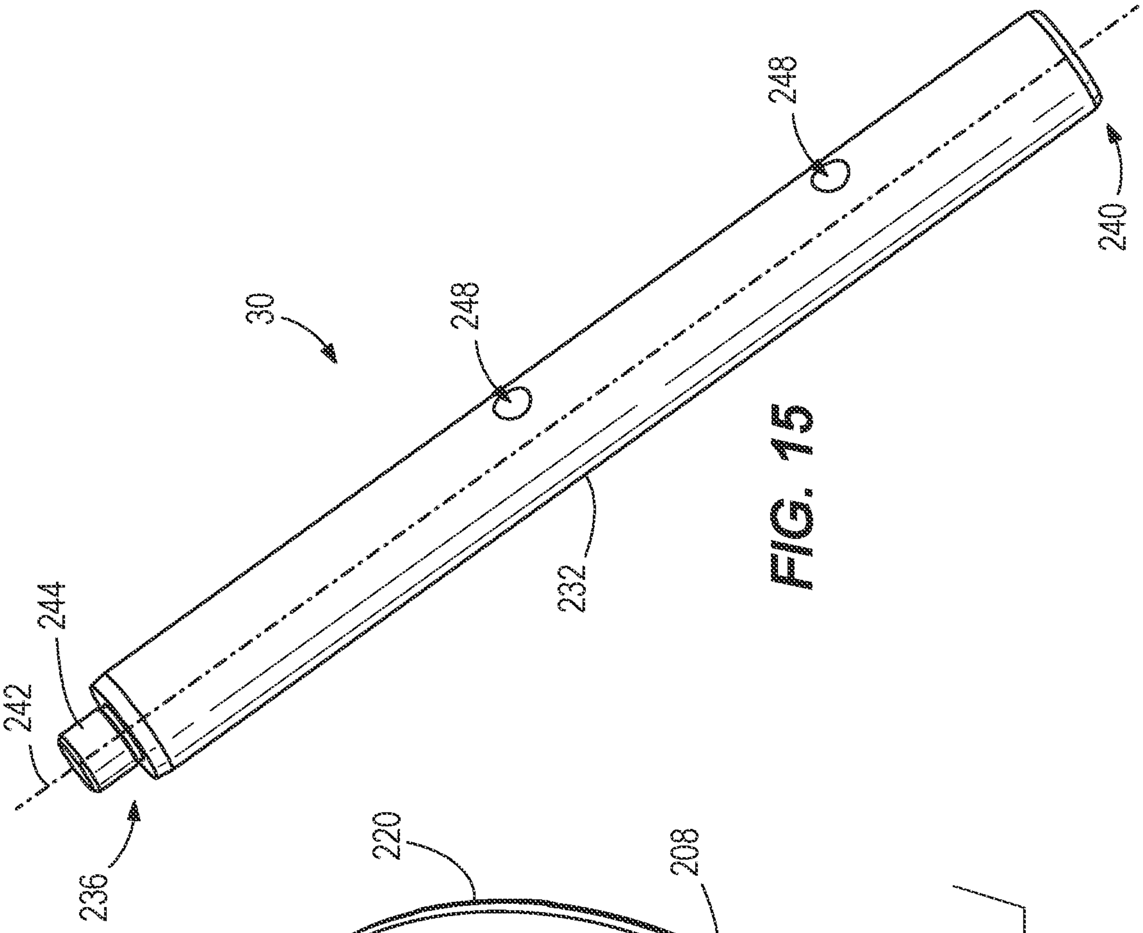
FIG. 15 is a perspective view of a shaft of the butterfly assembly shown in FIG. 12.
Figure 14:
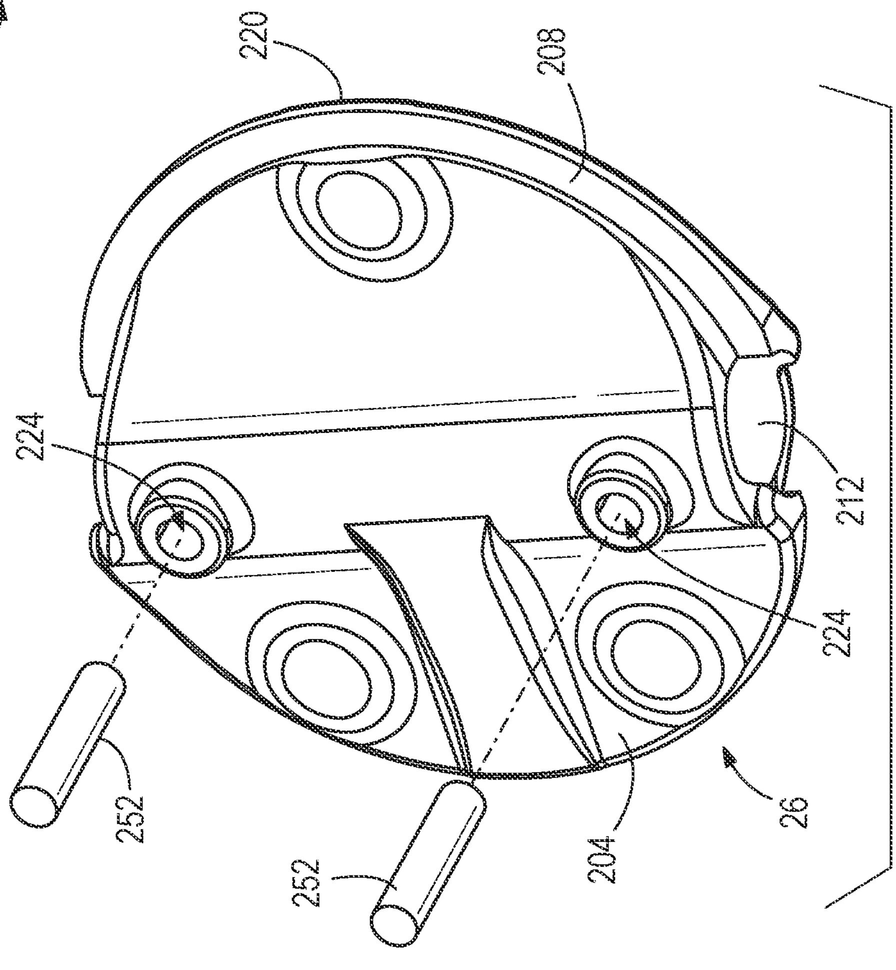
FIG. 14 is a front perspective view of a butterfly member and a pair of pins of the butterfly assembly shown in FIG. 12.

With reference to FIGS. 2-3A and 6-7, the gear assembly cavity 110 is defined by walls 140, which extend from the flow housing portion 18 and terminate at an end surface 144 defining a gear assembly opening 148. The gear assembly cavity 110 is structured to receive and support a gear assembly 150 (see FIGS. 10-11). A base wall 152 is formed along a bottom portion of the gear assembly cavity 110 and radially surrounds the bore 112. The walls 140 include a first step 156 extending from the base wall 152, a second step 164 formed on one side of the first step 156, and a third step 168 formed on the other side of the first step 156. A third bearing seat 184 extends through the steps 156, 164 and is spaced from the bore 112.

FIGS. 12-15 illustrate the butterfly assembly. The butterfly member 26 has a body 200 formed by a first plate 204 and a second plate 208 with a shaft bore 212 defined therethrough. The plates 204, 208 have a substantially circular shape to conform to the flow passage 62 of the flow housing portion 18. The plates 204, 208 are offset with a portion of the first plate 204 extending beyond the second plate 208 to form a first contact edge 216 on one side of the butterfly member 26 and a portion of the second plate 208 extending beyond the first plate 204 to form a second contact edge 220 on the other side of the butterfly member 26. As discussed below, the butterfly member 26 is drilled to define a number of pin holes 224 (two, in the illustrated construction) extending through the first plate 204 and has a corresponding number of protrusions 228 (two shown) extending from the second plate 208. The pin holes 224 and the protrusions 228 are aligned through a center of the shaft bore 212.

The shaft 30 has a body 232 with opposite ends 236, 240 extending along a shaft axis 242. A protrusion 244 extends from the first end 236, and a chamfered edge is formed on the second end 240. The body 232 has a first diameter, while the protrusion 244 has a smaller second diameter. As discussed below, the shaft 30 is drilled to define a number of pin holes 248 corresponding to the pin holes 224 (two shown) through the center of the body 232.

For some aspects of the valve assembly 10, when assembling the butterfly assembly, the butterfly member 26 is positioned in the flow passage 62, and the shaft 30 is inserted into the shaft bore 212 of the butterfly member 26 with the first end 236 extending a greater distance from the body 200 of the butterfly member 26 than the second end 240. The pin hole(s) 224, 248 are then drilled into the butterfly member 26 and the shaft 30. Depending on the size and loading requirements of the butterfly member 26, the pin hole(s) 224, 248 have a diameter of between about 2 millimeters (mm) and about 12 mm.

After the pin holes 224, 248 are drilled, a pin 252 is inserted into each set of pin holes 224, 248. Each pin 252 has a diameter about 5% less than the diameter of the pin holes 224, 248 so that the pin 252 easily slips into the pin holes 224, 248 to accommodate loose, low cost tolerances between the components. Each pin 252 is fully inserted into the pin holes 224, 248 to be guided.

After insertion, the pin 252 is then pressed (see FIG. 3B) between a tool (not shown) positioned through the pin hole 224 and the inner surface of the protrusion 228 to cause the pin 252 to "swell" (e.g., increase in diameter) to match the form and diameter of the pin holes 224, 248, causing material of the pin 252, the butterfly member 26 (proximate the pin hole 224) and the shaft 30 (proximate the pin hole 248) to deform and form a unitary structure. The pin holes 224, 248 fully guide the pin 252 during pressing so that the pin 252 is in a shear condition and no bending stress is applied. To deform the material, each pin 252 is pressed into the corresponding pin hole 224, 248 with a force of between about 1,500 pounds-force (lbf) and about 2,500 lbf. (e.g., about 2,200 lbf. (9,800 newtons (N))). The pressing process is conducted for between about 5 seconds (s) and about 30 s.

Considering that the exhaust gas through the valve assembly 10 has a temperature of about 600° C. (1,112° F.), the components of the butterfly assembly should expand and contract at the same rate. Components formed of materials with different coefficients of thermal expansion will expand and contract at different rates, causing the connection to loosen. To maintain connection of the butterfly assembly components during operation of the valve assembly 10 (e.g., heating and cooling), the material(s) (e.g., austenitic stainless steel, ferritic stainless steel, martensitic stainless steel, tool steel, etc., depending on application requirements) of the butterfly member 26, the shaft 30, and the pin(s) 252 are configured to have substantially equal coefficients of thermal expansion.

Figure 3B:
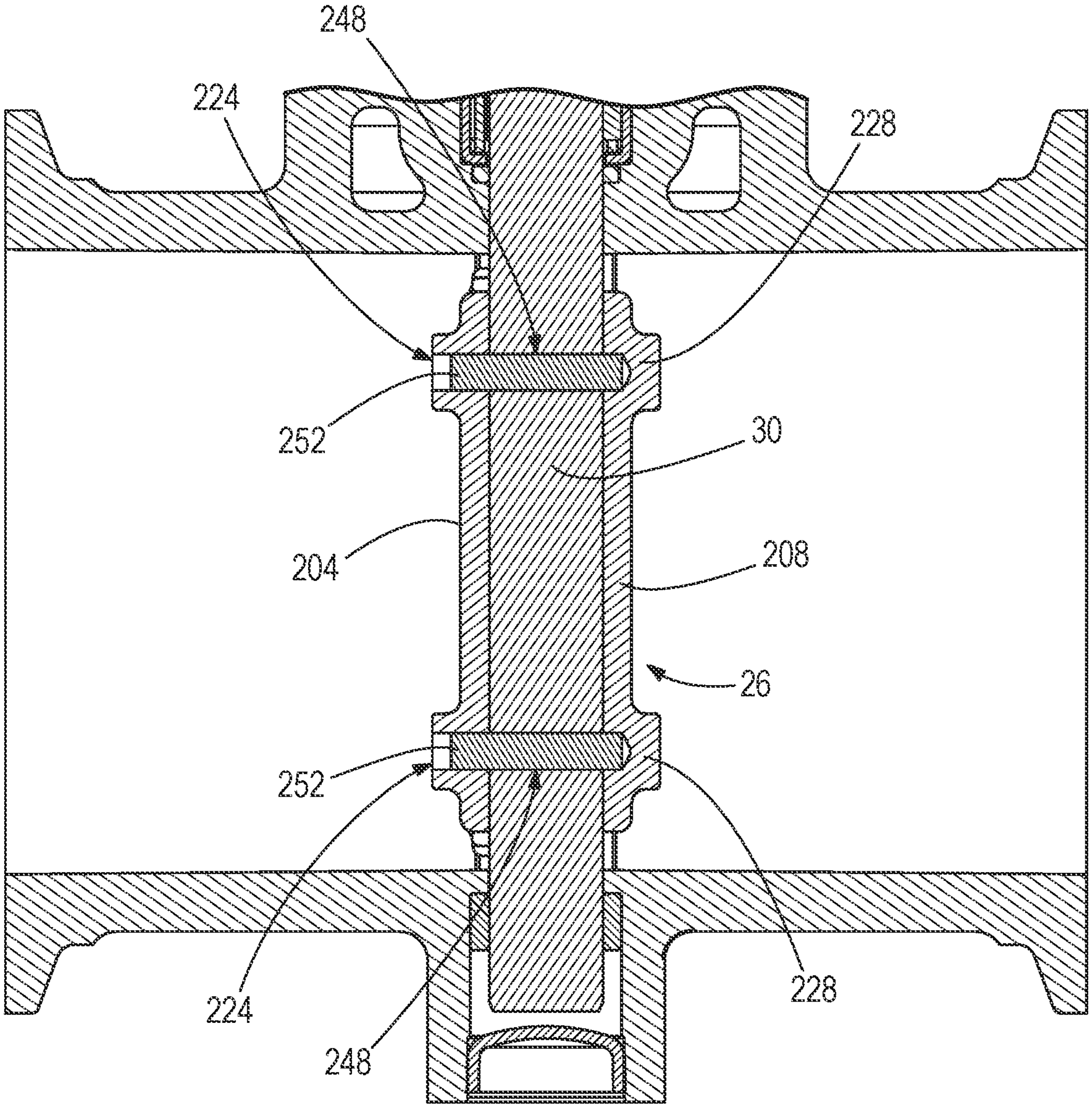
FIG. 3B is a side cross-sectional view of the valve assembly of FIG. 1, taken generally along line 3B-3B in FIG. 1.

With reference to FIGS. 2-3B, the butterfly assembly arranged centrally within the flow housing portion 18. The butterfly member 26 is arranged within the flow passage 62 so that, in the closed position, the second contact edge 220 sealingly engages the flange half 82*a* and the first contact edge 216 sealingly engages the flange half 82*b*. When assembled in the valve assembly 10, the butterfly assembly is configured to be pivoted about the axis 116 to control the flow of gas through the flow passage 62.

The body 232 of the shaft 30 extends through the bore 112 with the first end 236 positioned in the gear assembly cavity 110, and the second end 240 of the body 232 is positioned in the bore 94. A closure member 260 is arranged in the seat 108 to inhibit debris, contaminants, etc., from entering the bore 94.

As shown in FIGS. 2-3B and 10-11, the shaft 30 is pivotably coupled to the gear assembly 150. The gear assembly 150 includes a spring 300, a shaft gear 304, a rod gear 316, a rod 318, and a pinion gear 320 integrally formed on a motor shaft 324. The spring 300 is positioned along the base wall 152 and extends about the bore 112. One end of the spring 300 engages a notch 326 formed in the first step 156 (shown in FIG. 7) and the opposite end engages the shaft gear 304.

The shaft gear 304 is coupled for rotation with the shaft 30 and is positioned on the first step 156. The shaft gear 304 has a central portion 328 receiving the shaft 30 and a gear portion 332 (e.g., a spur gear) extending from the central portion 328. A pair of abutment surfaces 334 are formed on the central portion 328, with one abutment surface 334 configured to engage the end of the spring 300 to bias the butterfly assembly to the closed position.

The rod gear 316 (e.g., a spur gear) receives the rod 318 as the rod 318 is seated in the third bearing seat 184. The rod gear 316 is positioned along the second step 164. The rod gear 316 includes a first gear portion 316*a* and a second gear portion 316*b* extending from a center of the first gear portion 316*a*. The first gear portion 316*a* is configured to intermesh and be driven by the pinion gear 320 (e.g., a spur gear). The second gear portion 316*b* is configured to intermesh and drive the shaft gear 304 to rotate the shaft 30.

The electronics housing 42 is illustrated in FIGS. 1-3A and is configured to house and support an actuator assembly 400 operably coupled to the gear assembly 150 and the butterfly assembly. The actuator assembly 400 includes a motor 404 and a printed circuit board (PCB) 408 positioned within an electronics assembly cavity 412 of the electronics housing 42.

The illustrated motor 404 includes a brushless DC motor operable to drive the motor shaft 324. The motor shaft 324 extends from the electronics housing 42 and into the gear assembly housing portion 22, so that the pinion gear 320 intermeshes and drives the first gear portion 316*a* of the rod gear 316 when the motor 404 is actuated.

The PCB 408 is fixed to the electronics housing 42 by fasteners (not shown), thereby securing the PCB 408 and the motor 404 within the electronics assembly cavity 412. A connector 420 on the electronics housing 42 is configured to provide power and communication with electronic components of the actuator assembly 400. The PCB 408 supports electronic components (not shown) including a controller with an electronic processor, a motor controller, one or more sensors, etc.

The controller is electrically and/or communicatively connected to a variety of modules or components of the valve assembly 10. The controller includes a plurality of electrical and electronic components that provide power, operational control, and protection to the components and modules within the controller and/or the valve assembly 10. For example, the controller includes, among other things, the electronic processor (a programmable electronic microprocessor, microcontroller, or similar device), a memory (not shown), and an input/output (I/O) interface (not shown). The electronic processor is communicatively coupled to the memory and the I/O interface.

The controller may be implemented in several independent controllers each configured to perform specific functions or sub-functions. Additionally, the controller may contain sub-modules that include additional electronic processors, memory, or application specific integrated circuits (ASICs) for handling communication functions, processing of signals, and application of the methods listed below. In other embodiments, the controller includes additional, fewer, or different components.

The memory is, for example, a non-transitory, machine-readable memory. The memory includes, for example, one or more non-transitory machine-readable media, a program storage area and a data storage area. The program storage area and the data storage area can include combinations of different types of memory, such as read-only memory (ROM) and random access memory (RAM). In some embodiments, data is stored in a non-volatile random-access memory (NVRAM) of the memory. Various non-transitory computer readable media, for example, magnetic, optical, physical, or electronic memory may be used.

In the illustrated embodiment, the memory includes an input controller engine (not shown; for example, software or a set of computer-readable instructions that determines functions to be executed in response to inputs) and sensor assembly functions (for example, software or a set of computer-readable instructions that provide functionality to the valve assembly 10).

The electronic processor is communicatively coupled to the memory and executes software instructions that are stored in the memory, or stored in another non-transitory computer readable medium such as another memory or a disc. The software may include one or more applications, program data, filters, rules, one or more program modules, and other executable instructions. In some embodiments, the memory stores predetermined functions as well as other functions that are executed to provide a sensor assembly functionality, within the program storage area.

The I/O interface is communicatively coupled to components external to the controller and coordinates the communication of information between the electronic processor and other components of the valve assembly 10. In illustrated examples, information received from an input component, an external device, etc. is provided to the electronic processor to assist in determining functions to be executed and outputs to be provided. The determined functionality is executed with the electronic processor with the software located the memory.

Communication components are on the PCB 408 and are configured to communicate with external devices (e.g., an external control device). In the illustrated construction, the communication components are configured to transmit and receive signals with one or more external devices via a wired connection through the connector 420.

In operation, the motor 404 is operated to rotate the motor shaft 324, thereby driving the gear assembly 150 and the shaft 30 to pivot the butterfly member 26. The butterfly member 26 is pivoted between the closed position and the open position to control exhaust gas flow through the flow passage 62. In an open position, exhaust gas flows from the inlet 70 to the outlet 74.

With reference to FIGS. 2-3A, 5 and 8-9, the electronics housing 42 includes a mid-plate 424 fastened between the valve housing 14 and the electronics housing 42. The mid-plate 424 is configured to provide a seal between the valve housing 14 and the electronics housing 42 to inhibit contaminants from entering the electronics housing 42.

Figure 8:
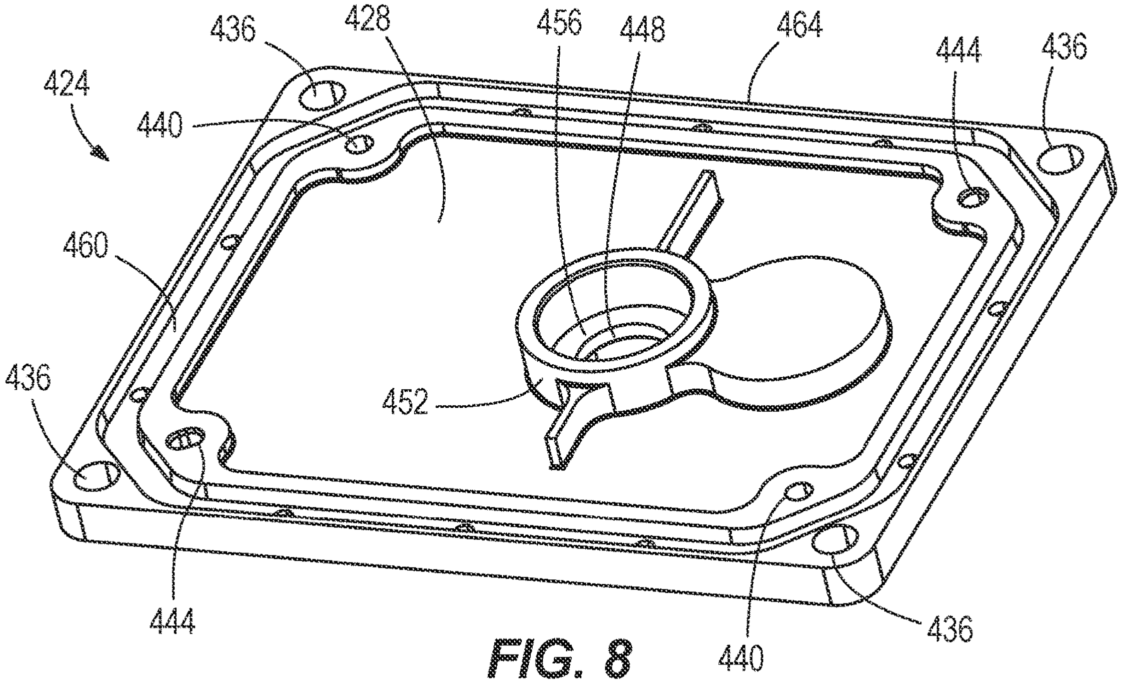
FIG. 8 is a top perspective view of the mid-plate shown in FIG. 5.
Figure 9:
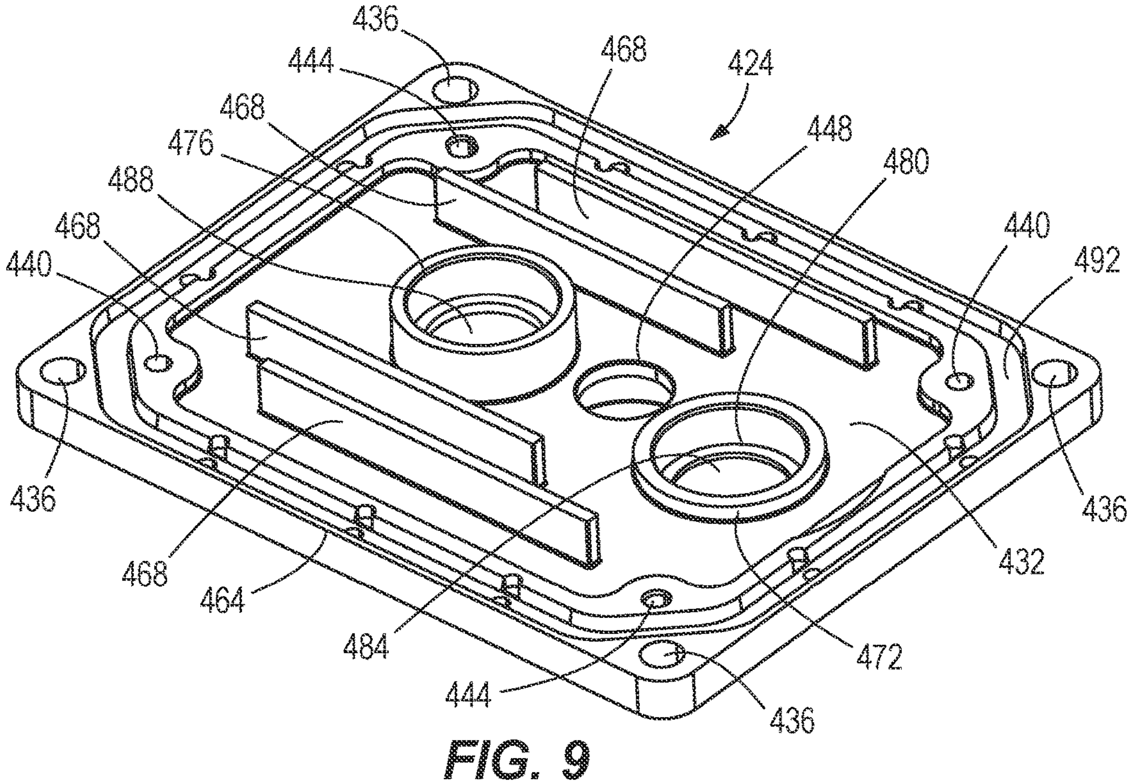
FIG. 9 is a bottom perspective view of the mid-plate shown in FIG. 5.

As shown in FIGS. 8-9, the mid-plate 424 has a top surface 428 facing towards the electronics housing 42 and a bottom surface 432 facing towards the electronics housing 42. First fastener holes 436, second fastener holes 440, and pin holes 444 extend through the mid-plate 424. The fastener holes 436 receive the fasteners 46 (see FIG. 1) to couple the mid-plate 424 between the valve housing 14 and the electronics housing 42. The fastener holes 440 receive fasteners (not shown) to couple the mid-plate 424 to the electronics housing 42. The pin holes 444 receive to receive pins (not shown) configured to be inserted into the valve housing 14 and the electronics housing 42.

The mid-plate 424 defines (see FIG. 8) a motor shaft opening 448 configured to allow the motor shaft 324 to extend through the mid-plate 424 and into the gear assembly housing portion 22. A wall protrusion 452 extends from the top surface 428 and is concentric with the motor shaft opening 448. The wall protrusion 452 forms a bearing seat 456 in the spacing between the motor shaft opening 448 and the wall protrusion 452. A groove 460 is formed in the top surface 428 and extends around a periphery 464 of the mid-plate 424.

As shown in FIG. 9, a plurality of projections 468, a first circular wall 472, and a second circular wall 476 extend from the bottom surface 432 of the mid-plate 424. The projections 468 are spaced apart and have a rectangular shape. The first circular wall 472 forms a bearing seat 480 that extends into the mid-plate 424 past the top surface 428 (see FIG. 8). The rod 318 extends into the bearing seat 480 against a bottom surface 484, thereby supporting the rod gear 316 for rotation. The second circular wall 476 forms a bearing seat 488 receiving the first end 236 of the shaft 30. A groove 492 is formed in the bottom surface 432 and extends around the periphery 464 of the mid-plate 424.

The bearing assembly 34 is illustrated in FIGS. 2-11. The bearing assembly 34 includes multiple bearings arranged on the shaft 30 and the gear assembly 150. A first shaft bearing 600 is arranged in the bearing seat 104 and supports the second end 240 of the shaft 30. A needle bearing 604 is arranged in the bearing seat 132 along the body 232 of the shaft 30. A second shaft bearing 608 is arranged in the bearing seat 488 and supports the first end 236 of the shaft 30. The bearings 600, 604, 608 rotatably support the shaft 30 within the valve housing 14.

A first rod bearing 612 is arranged in the third bearing seat 184 and supports one end of the rod 318, while the second rod bearing 616 is arranged in the bearing seat 480 and supports the other end of the rod 318. The rod gear 316 is positioned along the rod 318 between the rod bearings 612, 616. A motor shaft bearing 624 is arranged in a bearing seat 628 formed in the electronics assembly cavity 412 to further support the motor shaft 324.

The bore 112 provides a potential path from the flow passage 62 toward the electronics housing 42 for leakage of exhaust gas including constituents (e.g., sulfur) which are harmful to and may damage electronic components (e.g., the PCB 408 and its components). To inhibit such leakage, for some aspects, the valve assembly 10 includes the seal assembly 38 between the flow passage 62 and the electronics housing 42. FIGS. 2, 4 and 10-11 illustrate the seal assembly 38. The seal assembly 38 includes multiple sealing components positioned along a path from the flow passage 62, through the gear assembly housing 22 and into the electronics housing 42.

A first seal 700 (e.g., an O-ring, as illustrated) is arranged in the seal seat 128 between the shaft 30 and the bore 112 and along the shaft 30 between the flow passage 62 and the needle bearing 604. A second seal 704 (e.g., a rotary shaft seal, as illustrated) is arranged in the seal seat 136 between the shaft 30 and the bore 112 and along the shaft 30 between the needle bearing 604 and the gear assembly cavity 110. As such, the needle bearing 604 is disposed between the first and second seals 700, 704. The seals 700, 704 are configured to inhibit exhaust gas leakage along the bore 112 and into the gear assembly housing 22.

A pair of molded seals 708 (see FIG. 3A) are respectively inserted into the grooves 460, 492 of the mid-plate 424. The seal 708 in the groove 460 engages between the mid-plate 424 and the electronics housing 42 while the seal 708 in the groove 492 engages between the mid-plate 424 and the valve housing 14.

A sealed bearing 712 is arranged in the bearing seat 456 to support the motor shaft 324 on the mid-plate 424. The sealed bearing 712 provides a seal between the mid-plate 424 and the motor shaft 324 to inhibit exhaust gas leakage along the motor shaft 324 into the electronics housing 42, if any exhaust gas were to leak through the bore 112.

As mentioned above, the exhaust gas through the valve assembly 10 has a temperature of about 600° C. (1,112° F.). Such high temperatures can impair operation and damage components of the valve assembly 10, such as for example, the bearing assembly 34, the seal assembly 38, etc.

Figure 4:
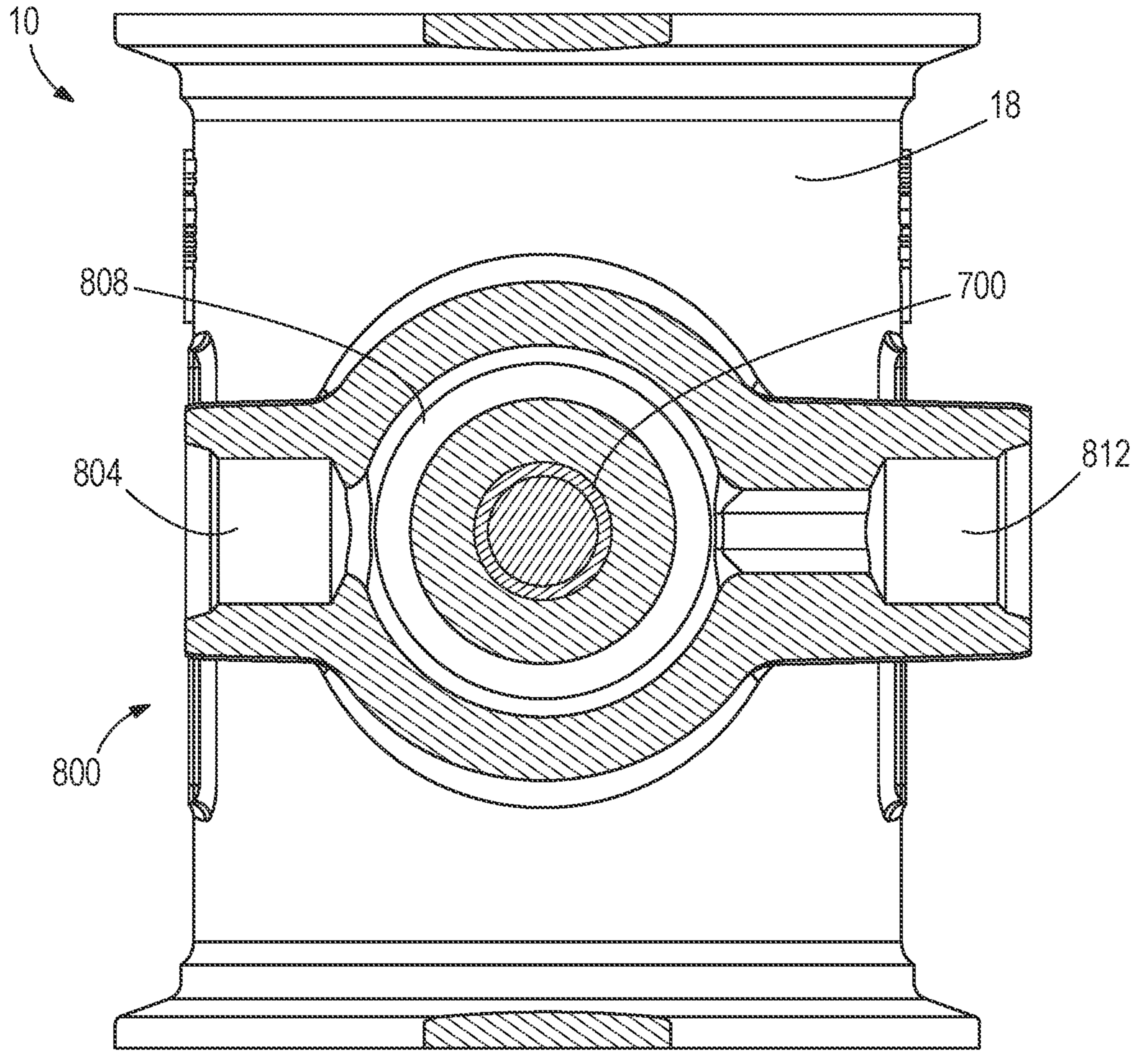
FIG. 4 is a top cross-sectional view of the valve assembly of FIG. 1, taken generally along line 4-4 in FIG. 1.

For some aspects, to reduce the temperature to which these components are exposed, as shown in FIGS. 2-4, a coolant jacket assembly 800, formed in the valve housing 14, is configured to receive coolant (e.g., anti-freeze). The coolant jacket assembly 800 includes a coolant inlet 804, a coolant intermediate portion 808, and a coolant outlet 812 to form a coolant channel. The illustrated coolant channel is proximate the first seal 700 and the needle bearing 604, and the coolant intermediate portion 808 is formed as a hollow loop that encircles the first seal 700 and the needle bearing 604. As shown in FIG. 4, the coolant channel extends transverse to the flow channel 62.

As shown in FIG. 2, the coolant intermediate portion 808 has an extent along the axis 116, and the seal 700, along with a majority of the needle bearing 604, is within this extent. Also, there is a portion of the coolant intermediate portion 808 positioned axially between the flow passage 62 and the seal 700.

Coolant enters the housing assembly 14 through the coolant inlet 804 and flows into the coolant intermediate portion 808 to cool the housing assembly 14, the first seal 700 and the needle bearing 604. After flowing through the coolant intermediate portion 808, the coolant exits through the coolant outlet 812. Providing the coolant jacket assembly 800 reduces the temperature experienced by components of the valve assembly 10 (e.g., to between about 200° C. and about 300° C.) while high temperature exhaust gas flows through the flow passage 62.

Although the disclosure has been described in detail with reference to certain preferred embodiments, variations and modifications exist within the scope and spirit of one or more independent aspects of the invention as described.

One or more independent features and/or independent advantages may be set forth in the following claims:

What is claimed is:

1. An exhaust gas recirculation valve assembly comprising:

a valve housing having a flow housing portion defining a flow passage extending therethrough and along a flow axis, a gear assembly housing portion coupled to the flow housing portion, and a shaft bore extending between the flow passage and the gear assembly housing portion;

a driven shaft positioned in the shaft bore and extending along a shaft axis generally transverse to the flow axis;

a shaft bearing disposed in the shaft bore and pivotably supporting the driven shaft;

a butterfly member coupled to the driven shaft for pivoting movement with the driven shaft about the shaft axis, the butterfly member being pivotable between a closed position, in which flow of gas through the flow passage is inhibited, and an open position;

an electronics housing coupled to the valve housing;

a printed circuit board supported in the electronics housing;

a drive pinion extending between the electronics housing and the gear assembly housing portion, the drive pinion being drivingly coupled to the driven shaft; and a sealing assembly to inhibit flow of gas from the flow passage into the electronics housing, the sealing assembly including a first seal positioned in the shaft bore and along the driven shaft to provide a seal between the driven shaft and the shaft bore, the first seal being disposed between the flow passage and the shaft bearing, a second seal positioned in the shaft bore and along the driven shaft to provide a seal between the driven shaft and the shaft bore, the second seal being disposed between the shaft bearing and the electronics housing, a plate engaged between the valve housing and the electronics housing, the plate defining an opening therethrough, the drive pinion extending through the opening into the gear assembly housing portion, and a sealed bearing supported by the plate and pivotably supporting the drive pinion in the opening, the sealed bearing providing a seal between the drive pinion and the plate.

2. The exhaust gas recirculation valve assembly of claim 1, wherein a bearing seat is formed in the shaft bore, the shaft bearing being arranged in the bearing seat.

3. The exhaust gas recirculation valve assembly of claim 2, wherein the shaft bearing includes a needle bearing.

4. The exhaust gas recirculation valve assembly of claim 2, wherein a first seal seat is formed in the shaft bore, the first seal being arranged in the first seal seat, the first seal seat being between the bearing seat and the flow passage.

5. The exhaust gas recirculation valve assembly of claim 4, wherein the first seal includes an O-ring.

6. The exhaust gas recirculation valve assembly of claim 4, wherein a second seal seat is formed in the shaft bore, the second seal being arranged in the second seal seat, the second seal seat being between the bearing seat and the electronics housing.

7. The exhaust gas recirculation valve assembly of claim 6, wherein the second seal includes a rotary shaft seal.

8. The exhaust gas recirculation valve assembly of claim 1, wherein the plate defines a first groove in a top surface and a second groove in a bottom surface, and wherein the sealing assembly includes a first molded seal positioned in the first groove and a second molded seal positioned in the second groove to provide the seal between the valve housing and the electronics housing.

9. The exhaust gas recirculation valve assembly of claim 8, wherein the first molded seal is engaged between the plate and the electronics housing, and wherein the second molded seal is engaged between the plate and the valve housing.

10. The exhaust gas recirculation valve assembly of claim 1, wherein the valve housing includes a wall defining the shaft bore, and wherein the exhaust gas recirculation valve assembly further comprises a coolant jacket extending about the wall, the coolant jacket having an axial extent along the shaft axis, the first seal and at least a portion of the shaft bearing being within the axial extent of the coolant jacket.

* * * * *